UNITED STATES PATENT OFFICE.

JAMES HENRY REID, OF PITTSBURGH, PENNSYLVANIA, ASSIGNOR TO INTERNATIONAL NITROGEN COMPANY, A CORPORATION OF DELAWARE.

PROCESS OF MAKING METAL NITROGEN-CONTAINING COMPOUNDS AUGMENTED BY GASEOUS CATALYSTS.

1,388,603.     Specification of Letters Patent.     Patented Aug. 23, 1921.

No Drawing.     Application filed September 12, 1917. Serial No. 191,053.

*To all whom it may concern:*

Be it known that I, JAMES HENRY REID, a citizen of the United States, residing in the city of Pittsburgh, county of Allegheny, State of Pennsylvania, United States of America, have invented certain new and useful Improvements in Processes of Making Metal Nitrogen-Containing Compounds, Augmented by Gaseous Catalysts, of which the following is a specification.

This invention relates to a process of fixing nitrogen and has for one of its objects the production of nitrogen containing compounds, having more fixed available nitrogen than those ordinarily secured from atmospheric nitrogen, in such a form or character that they will be available as agricultural fertilizers or as sources of ammonia or for other purposes and it comprises exposing heated metal carbid such as calcium carbid to the action of nitrogen and a gaseous catalyst, such as hydrogen chlorid in such a manner that the nitrogen is seized and fixed as a metal-nitrogen-containing-compound such as a calcium-nitrogen-containing-compound and the temperature controlled through the flow of the gaseous catalyst or hydrogen chlorid in such a manner that a metal-nitrogen-containing-compound or a calcium-nitrogen-containing-compound is produced below the temperature at which metal cyanamid or calcium cyanamid is formed, and after nitrification is finally secured.

As an example of the process, the making of a calcium-nitrogen-containing-compound from calcium carbid by the action of nitrogen associated with hydrogen chlorid will be taken.

Calcium carbid is taken, broken in small pieces, and heated to a point at which nitrogen combines therewith and then exposed to the action of nitrogen in the presence of hydrogen chlorid, which results in the absorption and fixation of nitrogen at a temperature lower than that at which calcium cyanamid is formed, the union and combination of nitrogen being induced, augmented and carried on below the temperature normally required for such union by the catalytic action of the gaseous hydrogen chlorid and the heat ordinarily evolved during the union or fixation of nitrogen is absorbed and carried away by the flowing hydrogen chlorid which thus acts as a refrigerant or cooling agent to control and maintain the temperature of the ingredients below that at which calcium cyanamid is formed and thus securing a calcium-nitrogen-containing-compound of greater agricultural fertilizing value, having less poisonous and deleterious effect on vegetation and greater facility in delivering its nitrogen than with calcium-nitrogen-containing fertilizers heretofore produced.

Instead of employing hydrogen chlorid as a gaseous catalyst, carbon tetrachlorid and many other volatile chlorids may be substituted, it being noted that the term "gaseous" employed is intended to include and does include a gas *per se* such as hydrogen chlorid or a vapor, vaporized or nebulized substance which is of gaseous character, such as may be produced by spraying, vaporizing or volatilizing a fluid or solid by the action of heat or other mechanical or chemical means.

The gaseous substance employed may exist as such or be delivered or yielded from substances capable of evolving and supplying the same, to the nitrogen, in such a manner that it may be conveyed in association with the nitrogen to the point at which its catalytic effect may become available to the fixation of nitrogen in the formation of metal-nitrogen-containing-compounds such as calcium-nitrogen-containing-compounds below the point at which the fixation of nitrogen in the formation of the nitrogen-containing-compound normally or commonly results.

The term or expression "gaseous catalyst" is intended to imply a gaseous substance of the character set forth which has the property of inducing and maintaining the fixation of nitrogen through its mere presence or association as a contact or catalytic agent.

The union of nitrogen with the ingredients or substances through the intermediation of a gaseous catalyst such as hydrogen chlorid has the effect of producing nitrogen containing compounds at lower temperatures which contain more available nitrogen for agricultural fertilizing and other purposes than those produced at more elevated temperatures such as the formation of calcium cyanamid by the action of nitrogen on calcium carbid at elevated or unrestrained temperature.

One of the principal features of the present invention is to produce nitrogen containing compounds having more available fixed nitrogen than is ordinarily obtained by directly exposing a carbid to the action of nitrogen and this is accomplished by exposing a metal carbid such as calcium carbid to the action of nitrogen in the presence of a gaseous catalyst and heat maintained below the temperature at which a metal cyanamid such as calcium cyanamid or other less available nitrogen containing compound is produced.

It is also advisable to carry on the process under super-atmospheric pressure, in some cases, which facilitates the condensed and concentrated action of the nitrogen on the ingredients. The nitrogen compounds produced by the practice of the process with calcium carbid and a gaseous chlorid is calcium cyanid ($CaC_2N_2$).

Having now described my invention what I claim is:—

1. The process of making metal nitrogen containing compounds which comprises exposing a metal carbid while associated with a gaseous catalyst to the action of nitrogen and heat and maintaining the temperature below that at which a metal cyanamid is formed.

2. The process of making metal nitrogen containing compound which comprises exposing a metal carbid while associated with a gaseous catalyst of the halogen group to the action of nitrogen and heat and maintaining the temperature below that at which a metal cyanamid is formed, by refrigeration.

3. The process of making a metal nitrogen containing compound which comprises exposing a metal carbid while associated with a gaseous catalyst to the action of nitrogen and heat and maintaining the temperature below that at which a metal cyanamid is formed by refrigeration controlled by the flow of the gaseous catalyst.

4. The process of making a calcium nitrogen containing compound which comprises exposing calcium carbid while associated with a gaseous catalyst containing a halogen to the action of nitrogen and heat and maintaining the temperature below that at which calcium cyanamid is formed.

5. The process of making a calcium nitrogen containing compound which comprises exposing calcium carbid while associated with a gaseous catalyst containing a halogen to the action of nitrogen and heat and maintaining the temperature below that at which calcium cyanamid is formed, by refrigeration.

6. The process of making a calcium nitrogen containing compound which comprises exposing calcium carbid while associated with a gaseous catalyst containing a halogen to the action of nitrogen and heat and maintaining the temperature below that at which calcium cyanamid is formed by refrigeration controlled by the flow of gaseous catalyst.

7. The process of making metal nitrogen containing compound which comprises exposing a metal carbid while associated with a gaseous chlorid to the action of nitrogen and heat and maintaining the temperature below that at which a metal cyanamid is formed.

8. The process of making a metal nitrogen containing compound which comprises exposing a metal carbid while associated with gaseous chlorid to the action of nitrogen and heat and maintaining the temperature below that at which a metal cyanamid is formed, by refrigeration.

9. The process of making a metal nitrogen containing compound which comprises exposing metal carbid while associated with gaseous chlorid to the action of nitrogen and heat and maintaining the temperature below that at which a metal cyanamid is formed, by refrigeration controlled by the flow of the gaseous chlorid.

10. The process of making a calcium nitrogen containing compound which comprises exposing calcium carbid while associated with gaseous chlorid to the action of nitrogen and heat and maintaining the temperature below that at which calcium cyanamid is formed.

11. The process of making a calcium nitrogen containing compound which comprises exposing calcium carbid while associated with a gaseous chlorid to the action of nitrogen and heat and maintaining the temperature below that at which calcium cyanamid is formed, by refrigeration.

12. The process of making a calcium nitrogen containing compound which comprises exposing calcium carbid while associated with a gaseous chlorid to the action of nitrogen and heat and maintaining the temperature below that at which calcium cyanamid is formed, by refrigeration controlled by the flow of the gaseous chlorid.

13. The process of making a metal nitrogen containing compound which comprises exposing a metal carbid while associated with gaseous hydrogen chlorid to the action of nitrogen and heat and maintaining the temperature below that at which a metal cyanamid is formed.

14. The process of making a metal nitrogen containing compound which comprises exposing a metal carbid while associated with gaseous hydrogen chlorid to the action of nitrogen and heat and maintaining the temperature below that at which a metal cyanamid is formed, by refrigeration.

15. The process of making a metal nitrogen containing compound which comprises exposing a metal carbid while associated with gaseous hydrogen chlorid to the action of nitrogen and heat and maintaining the temperature below that at which a calcium cyanamid is formed, by refrigeration controlled by the flow of the gaseous hydrogen chlorid.

16. The process of making a calcium nitrogen containing compound which comprises exposing calcium carbid while associated with gaseous hydrogen chlorid to the action of nitrogen and heat and maintaining the temperature below that at which calcium cyanamid is formed.

17. The process of making a calcium nitrogen containing compound which comprises exposing calcium carbid while associated with gaseous hydrogen chlorid to the action of nitrogen and heat and maintaining the temperature below that at which a calcium cyanamid is formed, by refrigeration.

18. The process of making a calcium nitrogen containing compound which comprises exposing calcium carbid while associated with gaseous hydrogen chlorid to the action of nitrogen and heat and maintaining the temperature below that at which calcium cyanamid is formed, by refrigeration controlled by the flow of the gaseous hydrogen chlorid.

19. The process of fixing nitrogen which comprises exposing heated metal carbid to the action of nitrogen under super-atmospheric pressure in the presence of a gaseous catalyst.

20. The process of fixing nitrogen which comprises exposing heated metal carbid to the action of nitrogen under super-atmospheric pressure in the presence of hydrogen chlorid.

21. The process of fixing nitrogen which comprises exposing heated calcium carbid to the action of nitrogen under super-atmospheric pressure in the presence of a gaseous catalyst containing a halogen.

22. The process of fixing nitrogen which comprises exposing heated calcium carbid to the action of nitrogen under super-atmospheric pressure in the presence of hydrogen chlorid.

In testimony whereof I affix my signature in the presence of two witnesses.

JAMES HENRY REID. [L. S.]

Witnesses:
ERNEST H. BALL,
WALTER D. KEMP.